United States Patent [19]
Juncker

[11] 3,744,349
[45] July 10, 1973

[54] CHAIN SAW SHARPENER
[76] Inventor: Arnold A. Juncker, R.R 2, Box 244, Mount Vernon, Ind. 47620
[22] Filed: Apr. 6, 1972
[21] Appl. No.: 241,730

[52] U.S. Cl. .................................. 76/25 A, 76/31
[51] Int. Cl. ..................... B23d 63/10, B23d 63/16
[58] Field of Search ...................... 76/25 A, 31, 36

[56] References Cited
UNITED STATES PATENTS
| | | | |
|---|---|---|---|
| 2,762,241 | 9/1956 | Nielson | 76/31 |
| 2,818,752 | 1/1958 | Granberg | 76/25 A |
| 2,440,633 | 4/1948 | Hall | 76/36 |

Primary Examiner—Leonidas Vlachos
Attorney—Harold B. Hood

[57] ABSTRACT

A chain saw sharpener comprising a frame to straddle a cutter bar and a section of chain mounted thereon, a clamp screw to secure a chain tooth temporarily relative to the frame, clamp screws to secure the frame to the cutter bar, a guideway in the frame to guide the chain for movement relative to the first clamp screw to bring teeth successively into cooperative relation with the clamp screw, a carriage supported from the frame for adjustable movement relative to the frame in the direction of length of the cutter bar and in a direction transverse relative to the cutter bar, and a stop projecting into the path of travel of the teeth to establish a fixed working position for any tooth to be treated, the carriage being formed with a first guide bore to pass and guide a round file in a position to sharpen left-hand teeth engaging the stop and held by the first clamp screw, a second guide bore to pass and guide the same file in a position to sharpen right-hand teeth engaging the stop and held by the first clamp screw, and a third guide bore to pass and guide the same file in a position to shorten the depth gage of either a left-hand tooth or a right-hand tooth engaging the stop and held by the first clamp screw.

10 Claims, 8 Drawing Figures

Patented July 10, 1973

Patented July 10, 1973 3,744,349
2 Sheets-Sheet 2
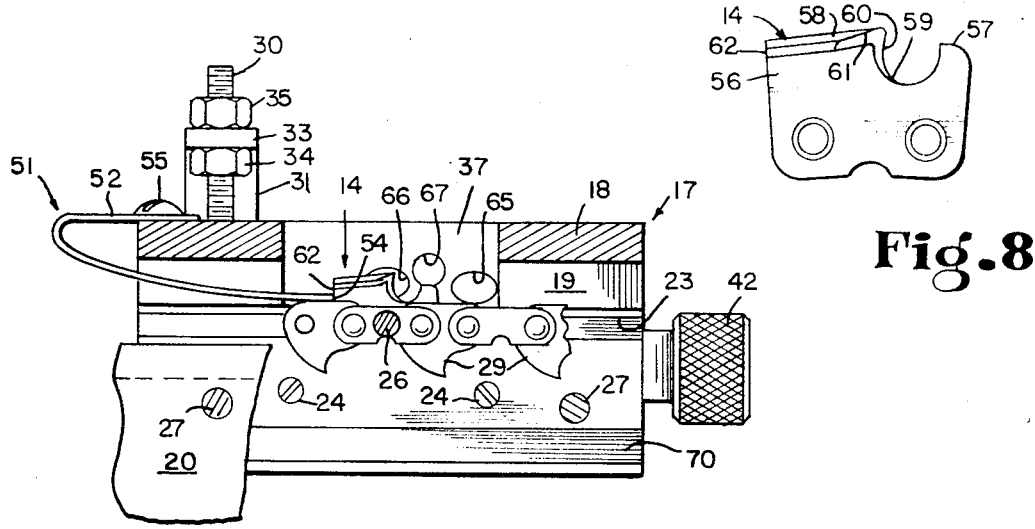
Fig.5
Fig.8
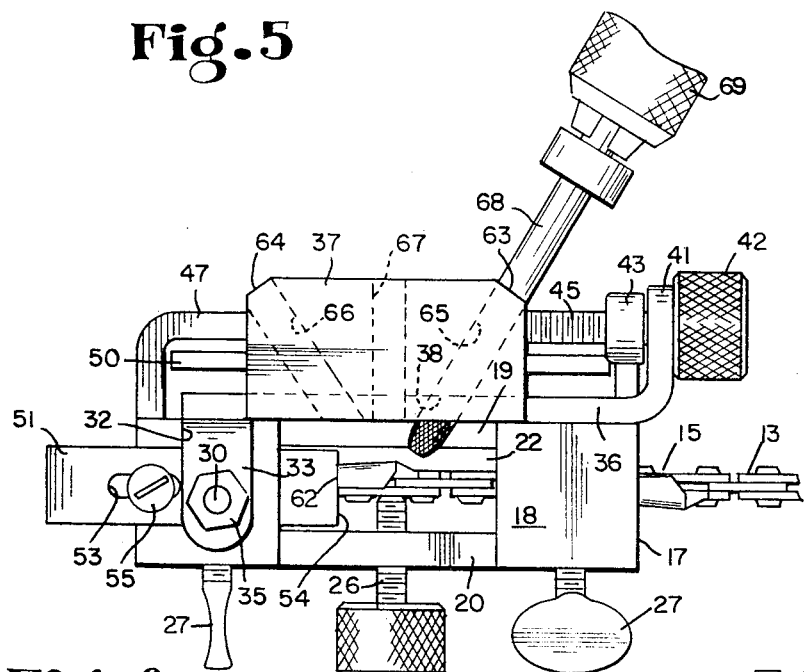
Fig.6
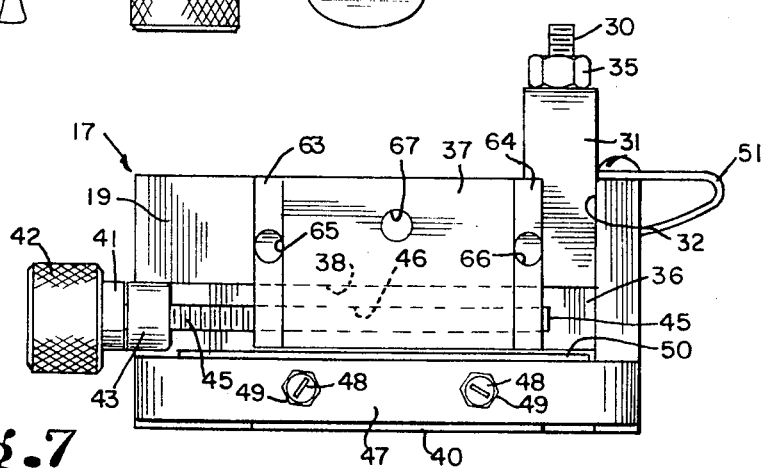
Fig.7

CHAIN SAW SHARPENER

The present invention relates to a chain saw sharpener or, more accurately, to a jig for use in sharpening and dressing the teeth of a saw chain. The primary object of the invention is to provide a small, light, inexpensive, uncomplicated tool which may be readily installed on the cutter bar of a chain saw to straddle a section of the chain, which is provided with readily-releasing means for clampingly engaging the cutting teeth of a chain successively to hold each tooth in exact position while it is being sharpened, which is provided with means for affirmatively establishing the right position for each tooth successively to be treated, and which is provided with a carriage formed with a plurality of guide bores therethrough to receive and pass, selectively, a round file, and which is provided with means for shifting or adjusting that carriage to, and securing it in, selected positions relative to the main body of the device whereby various sharpening and trimming operations may be quickly, easily and accurately accomplished with minimum difficulty.

Further objects of the invention will appear as the description proceeds.

To the accomplishment of the above and related objects, this invention may be embodied in the form illustrated in the accompanying drawings, attention being called to the fact, however, that the drawings are illustrative only, and that change may be made in the specific construction illustrated and described, so long as the scope of the appended claims is not violated.

FIG. 5 is a similar view but with part positioned for a depth gage shortening operation;

FIG. 6 is a top plan view similar to FIG. 2 but showing a round file mounted in a hand drill unit and passing through a guide bore in the carriage to begin a sharpening operation on a left-hand tooth;

FIG. 7 is a rear view taken from the right of FIG. 3; and

FIG. 8 is an enlarged, side elevation of a conventional round-ground cutting tooth for a saw chain.

Figure 1:
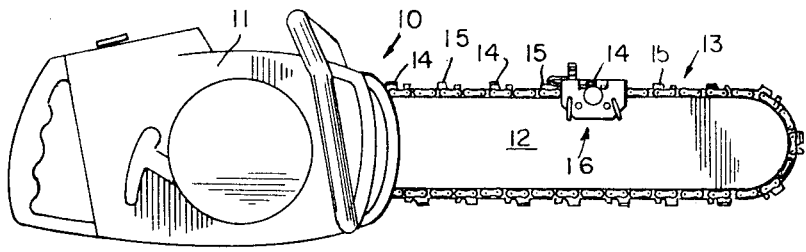
FIG. 1 is a side elevation of a conventional, small chain saw with my sharpener in operating position thereon.

Referring more particularly to the drawings, the reference numeral 10 indicates a conventional small, household or farmyard chain saw having an engine and drive case 11, a cutter bar 12 and a saw chain 13 mounted thereon in the conventional fashion. Such a chain, as is well known, comprises left-hand teeth and right-hand teeth which are allochiral relative to each other and arranged alternately on opposite sides of the chain with cooperating connector links 71, and between guide links 29, so that each tooth 14 or 15 comprises a working link in the chain.

My improved sharpener is indicated generally by the reference numeral 16. It comprises a U-shaped frame 17 including a web 18 and downturned inner and outer side walls 19 and 20 which terminate in free ends, the frame being proportioned and designed to straddle the cutter bar 12 and a section of the chain 13 in the manner perhaps most clearly illustrated in FIG. 3.

The lower portion of the inner surface of the outer side wall 20 is formed with a shallow, longitudinal seat 21 receiving an anvil plate 22 which is formed in its inner face and near its upper edge with a longitudinal groove or guideway 23. The guideway 23 is proportioned guidingly to receive the projecting heads of the chain rivets, thereby to guide the chain as it is moved, step-by-step, through the sharpener as will be more clearly explained hereinafter. The anvil plate 22 is removably secured in place in the seat 21 by means of screws 24, 24 for a purpose which will appear; and the inner side wall 19 is formed with access openings (not shown) aligned with the heads of said screws.

Approximately midway of its length, the web 18 and the upper regions of the side walls are interrupted to provide a viewing opening.

Immediately below that opening, and substantially at the midpoint in the length of the frame, the wall 19 is formed with a threaded bore 25 for the reception of a clamp screw 26; and, at a lower level, said wall is formed with two further threaded bores for the reception of wing screws 27, 27.

Figure 3:
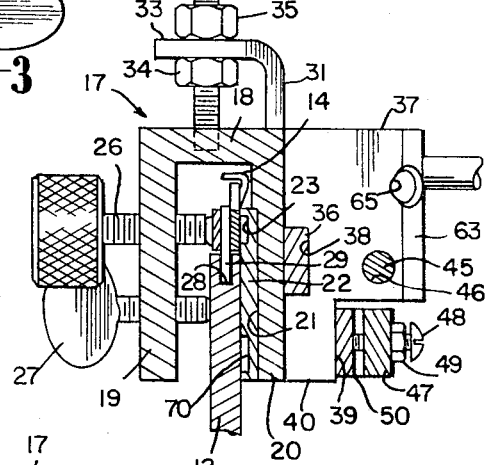
FIG. 3 is a section taken substantially on the line 3—3 of FIG. 2.

Conventionally, the cutter bar 12 is formed with a perimetral guide channel 28 in which the toes of the guide links 29 ride during operation of the saw (FIG. 3).

An upstanding, threaded post 30 is threadedly seated in the web 18. A vertical guide bar 31 is slidably received in a vertical guide channel 32 in the outside surface of the outer wall 20. The upper end of the bar 31 is turned forwardly (FIG. 3) to define a horizontal toe 33 which is perforated to pass the post 30; and adjusting nuts 34 and 35 are threadedly mounted on the post 30 respectively below and above said toe. Thus, by adjustment of the nuts, the guide bar 31 may be moved upwardly and downwardly and may be locked in position relative to the frame 17.

Figure 2:
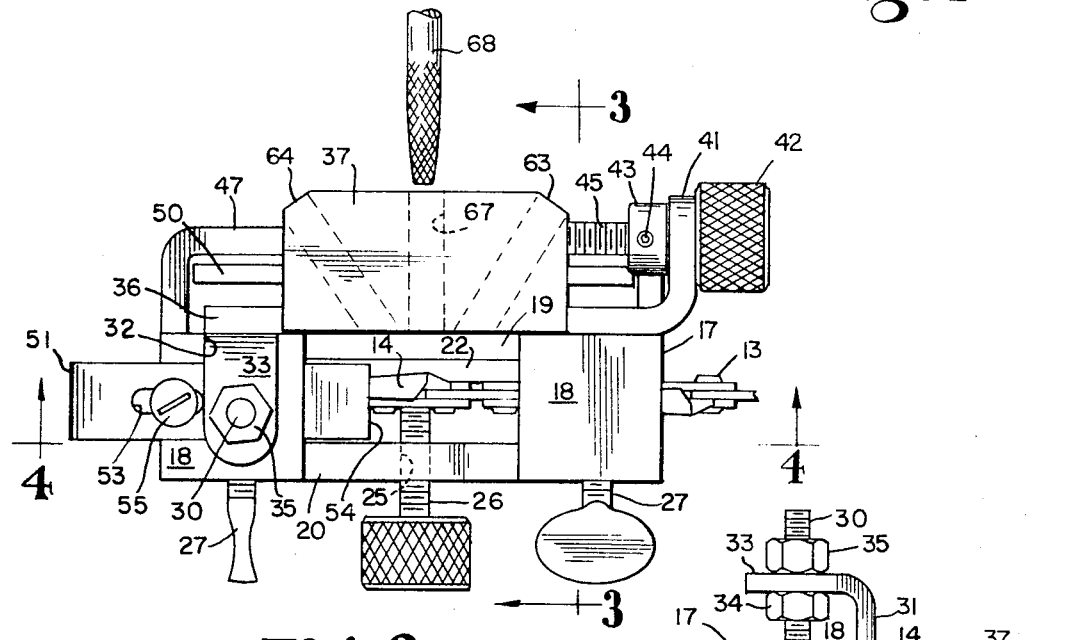
FIG. 2 is an enlarged, top plan view of the sharpener.

A horizontal guide bar 36 (FIGS. 2, 6 and 7) is rigidly fixed to the bar 31 and bears slidingly against the outside surface of the outer wall 20. The bar 36 is slidably received in an open-ended guideway 38 formed in the forward face of a carriage 37, whereby the carriage 37 is supported for vertical movement with the guide bar 31 and for horizontal movement relative to the guide bar 36. A recess 39 is formed in the lower region of the carriage 37 to define a narrow, depending tongue 40 at the bottom of said carriage. A U-shaped strap 47 has its opposite ends welded to the frame 17 and substantially registers with the recess 39. Set screws 48, equipped with lock nuts 49, are threaded through the strap body to engage a bearing plate 50 interposed between the strap and the adjacent face of the tongue 40. Preferably, the distal ends of the screws 48 will engage in shallow sockets (not shown) in the adjacent face of the bearing plate 50 for convenience in assembly. In use, the screws 48 are turned down only heavily enough to hold the carriage 37 against disengagement from the bar 36, thus permitting sliding, longitudinal adjustment of the carriage, until the carriage has been brought to a selected use position, whereupon said screws can be turned down more tightly to anchor the carriage 37 in such selected position.

Figure 4:
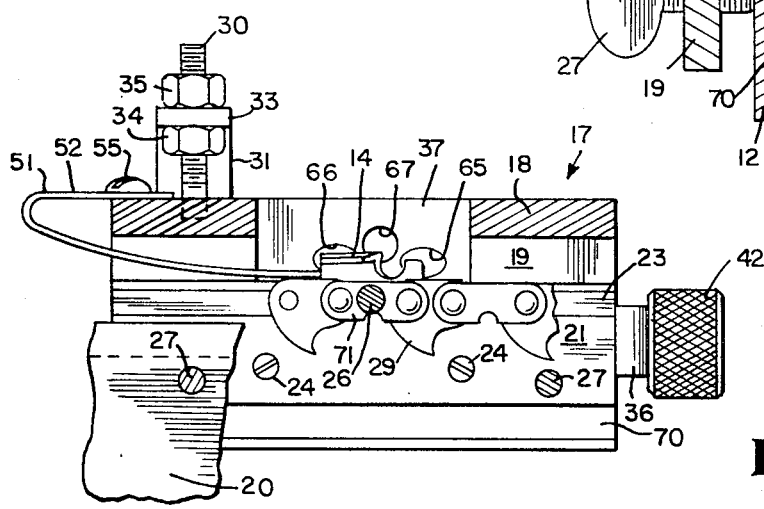
FIG. 4 is a longitudinal section taken substantially on the line 4—4 of FIG. 2, with parts broken away for clarity of illustration and with parts positioned for a sharpening operation.

At one end (see FIGS. 2 and 4) the guide bar 36 is turned rearwardly to define a toe 41 which is perforated to define a bearing for an unthreaded neck portion of a screw 45, a collar 43 being mounted on said screw adjacent said toe 41 by means of a set screw 44 to cooperate with a knurled knob 42 on the end of said screw to hold the same against significant axial movement relative to the toe 41. The screw 45 threadedly penetrates a threaded bore 46 through the carriage 37. Thus, by rotation of the knob 42, when the screws 48 are not set heavily to anchor the carriage 37, the carriage may be accurately adjusted through a relatively long path longitudinally of the frame 17 and the sight opening.

A reversely-bent leaf spring 51 has one end region 52 formed with a longitudinal slot 53 penetrated by a screw 55 which takes into the web 18, whereby the spring is adjustably anchored to the frame 17. The other end region of the spring extends through the entrance end of the frame 17 between the legs 19 and 20 terminates within the sighting region in a square abutment 54 to act as stop means as will be explained hereinafter.

As is most clearly illustrated in FIG. 8, one form of conventional saw chain tooth comprises a link body 56 formed to provide an upstanding depth gage 57, a blade or tooth proper 58 rearwardly separated from the depth gage by a gullet region 59, the forward edge of the blade being formed to define a scoring edge 60 and a routing edge 61. It is well known that the tip of the depth gage 57 should be spaced approximately 0.025 inch below the level of the routing edge 61. It will be apparent that the portion of the tooth which defines the routing edge inclines slightly both rearwardly and inwardly from its maximum extent. Teeth of this character should be hollow ground or round ground at a rake angle which, in most instances, is 35°. The reference numeral 62 indicates the upstanding back edge of the tooth link.

It will be perceived that the abutment end 54 is disposed in interfering relationship with the back edge 62 of any tooth which is located in the sighting region to the right of the spring 51.

The rear vertical corners of the carriage 37 are bevelled as at 63 and 64 at any selected angle, but preferably at an angle of 35° to the end surfaces of the carriage. A smooth guide bore 65 is formed from the bevelled corner 63 to open into the sighting space and a similar bore 66 is formed to extend from the bevelled corner 64 to open into said sighting space. Preferably, the axes of the bores 65 and 66 will be perpendicular to the bevelled surfaces 63 and 64; and those surfaces will lie in planes which are oppositely angularly related at 55° to the rear surface of the carriage 37, so that the axes of the bores 65 and 66 incline toward each other to form a 70° angle as they emerge through the forward surface of the carriage into the observation space.

Obviously, the selected angle between the axes of the bores 65 and 66 will depend upon the desired degree of rake of the routing edge 61.

At a point midway between the bores 65 and 66, but at a level higher than that of the plane common to the axes of those bores, a third guide bore 67 penetrates the carriage with its axis perpendicular to the rear surface of the carriage, for a purpose to be explained.

OPERATION

It is, of course, highly desirable to be able to sharpen a chain in situ. According to the present invention, the saw is placed on a suitable support with the cutter bar 12 in a vertical plane. Most power saws are stable in this position; but, if desired, the saw may be secured in place in any desirable manner. Now, my sharpener is slipped over the upper edge of the bar 12 in a position to bring the inner end of the screw 26 into registry with substantially the midpoint of, for instance, a connector link 71 opposed to a left-hand tooth 14, and the screw 26 is turned up tighty against that connector link to secure the sharpener 16 firmly to the chain. At this time, the back 62 of the engaged tooth should bear against the abutment end 54 of the spring 51; and if it does not, the screw 55 will be loosened, the spring will be adjusted and the screw 55 will be retightened. Now, the screws 27, 27 are tightened to secure the frame 17 to the cutter bar 12.

Thereupon, a selected round file of appropriate size and shape is slipped through the guide bore 65. It will be noted that the illustrated file is somewhat tapered. The nose of the file is advanced until it overlaps the entire length of the routing edge 61 of the tooth. Now the screws 48 are relaxed sufficiently to permit the screw 45 to shift the carriage 37, and the knob 42 is adjusted until the file touches the edge of the tooth.

Now, the screws 48 are tightened, and locked by manipulation of the nuts 49, and the file 68 is backed away from contact with the tooth 14. A conventional power drill drive unit, suggested at 69 in the drawings, may now be connected operatively to the file 68; and, with the file turning, the drill is advanced to move the file across the front of the tooth, and back. This operation, because of the taper of the file, will remove just enough of the front face of an ordinarily worn tooth to sharpen the scoring edge 60 and the routing edge 61 of the tooth very effectively.

Now, the screw 26 will be withdrawn from contact with the chain and the chain will be manually moved toward the right as viewed in, for instance, FIG. 6. The next succeeding tooth in the chain, of course, will be a right-hand tooth 15. As it moves toward the right, it will flex and lift the inner end of the spring 51, but movement of the chain will be continued until the following tooth 14 engages, flexes and lifts the inner end of the spring 51 and that end falls off the back end of the tooth. It will be perceived that if, now, the chain is moved toward the left until the tooth back engages the abutment 54, this tooth will be related to the guide bore 65 exactly as was the tooth which has just been sharpened. Now the sharpening movement of the rotating file 68 past the tooth edge and return will effectively sharpen the second tooth 14.

This cycle is repeated until every left-hand tooth has been sharpened. Thereupon, desirably without moving the sharpener 16, the screw 26 will be withdrawn, the chain will be advanced to move a right-hand tooth 15 past the stop 54 and back into engagement with the stop, the screw 26 will be advanced to clamp the chain in position and the file 68 will be entered through the guide bore 66 to move past and be withdrawn from the selected tooth 15 to sharpen that tooth. That cycle will be repeated for each tooth 15.

Then, without moving the chain, the file will be withdrawn and the carriage 37 will be adjusted to bring the guide bore 67 into alignment with the depth gage 57 of the tooth which has last been sharpened. The optimum vertical distance between the highest point on the routing edge 61 of a tooth and the distal tip of the depth gage of that tooth is a matter which is well understood and standardized in the art. For most sizes of teeth, that distance should be 0.025 inch; and the level of the axis of the guide bore 67 above the level of the plane common to the axes of the bores 65 and 66 is such that, when the turning file 68 is moved through the bore 67 past the depth gage 57 and returned, the depth gage will be ground (if necessary) to that optimum distance below the high point on the routing edge 61 of the tooth. It will be appreciated, of course, that the bore 67 must be above the bores 65 and 66 because it is substantially the vertical radius of the file which engages the depth gage, while it is a lateral radius thereof which engages the sharpened faces of the cutting tooth.

In this operation of filing the depth gages, it is not necessary to file alternate teeth in succession. Instead, the depth gages of successive teeth may be trimmed in succession.

Chains and cutter bars are made in various sizes; and the sharpener disclosed herein is adaptable to use with various sizes of chains and teeth. As shown particularly in FIGS. 3, 4 and 5, the anvil plate 22 is formed with a second longitudinal groove or guideway 70, wider than the groove 23 and located at the opposite edge of the plate. If a larger chain is to be used, the screws 24 are removed, the plate 21 is inverted, end-for-end, and the plate is reseated in the seat 21 and secured in place by the screws 24. The groove 70 is sized to fit the rivet heads of such larger chain. The teeth of the larger chain will, of course, be higher than the teeth herein illustrated; and therefore it will be necessary to readjust the elevation of the carriage 37. The screws 48 are relaxed to exert only a sliding pressure of the plate 50 against the back surface of the tongue 40, the nut 35 is moved upwardly on the screw 30 and the nut 34 is manipulated to raise the vertical guide bar 31 to the desired degree. Since the bar 31 is rigid with the bar 36, the carriage 37 will be correspondingly elevated. The correct elevation of the carriage 37 can be determined by testing with a file 68 inserted through the bore 65 against a tooth bearing upon the stop 54, but without rotation of the file. When the correct position for the carriage 37 has been determined, the carriage will be anchored in place by turning the nut 35 down tightly against the finger 33, turning the screws 48 to press the bar 50 tightly against the tongue 40 and anchoring the screws 48 in place by manipulation of the lock nuts 49. Once the proper relationship among the parts has thus been established, the sharpening operation upon the larger chain will be identical with that described above for the smaller chain.

Adjustment of the spring 51 through the path permitted by the slot 53 will seldom be necessary once it has been located in a position such that availability of the bores 65, 66 and 67 to a tooth bearing against the spring end 54 is readily achievable within the range of longitudinal adjustability of the carriage 37; but provision for such adjustability of the spring is believed to be desirable in order to lend maximum flexibility to the tool in use.

The rotary file to be used in the practice of the invention is readily available on the market and is made of carbide steel which is very durable. It has been found that such a file, when driven as described above, does not deleteriously affect the natural temper of the conventional tooth, whereas grinding wheels do have such a deleterious effect. The concept of using a conventional power drill motor unit to drive the file facilitates use of the sharpener since almost any owner of a chain saw would have such an electric drill unit.

A further advantage of the present invention resides in the fact that a round file of the character herein disclosed is capable of making relatively deep cuts, if desired, so that, within reason, no matter how battered a particular tooth may be, it may be sharpened with a single in-and-out pass of the file, whereas an abrasive wheel will not cut more than a few thousandths at each pass. Further, while the present sharpener is inherently adjustable to an extent sufficient to provide for all of the operations for which it will be used, the adjustment devices built into it are few and simple so that the sharpener can be built to sell at a modest price and can be adjusted to perform its function by relatively unskilled operators. Once it is set for one particular kind of operation, that operation may be repeated innumerable times without requiring additional adjustment, to produce a truly uniformly sharpened chain.

Of course, adjustment of the spring 51 through manipulation of the screw 55 and movement of the spring within the range of the slot 53 will be highly desirable, if not essential, when changing from one size of chain and tooth assembly to another size. While inversion of the anvil plate 22 to accommodate one other size of chain has been mentioned above, of course it will be understood that additional, interchangeable anvil plates could be provided with grooves to accommodate the rivet head size of any desired number of chain sizes.

I claim as my invention:

1. In a chain saw sharpener, a frame comprising a web and spaced, parallel side walls extending therefrom to free edges, a carriage supported from one of said walls, outwardly thereof, for guided adjustment longitudinally thereof, means providing a longitudinal guideway inwardly of said one wall, threaded means supported by the other of said walls for movement toward and away from said one wall, two clamp screws, respectively penetrating said other wall at points near opposite ends thereof and more remote from said web than is said threaded means, said walls being interrupted intermediate their ends in a region near said web, said carriage being formed with two guide bores of equal diameter and equiangularly inclined toward each other to open through the inner face of said carriage into the region of interruption of said walls, and with a third bore of equal diameter opening perpendicularly through said face into said region, and means for accurately adjusting said carriage longitudinally of said frame.

2. The device of claim 1 in which the axes of said two guide bores lie in a common plane substantially perpendicular to said side walls and the axis of said third bore lies in a plane parallel to said common plane and between said common plane and the level of said web.

3. The device of claim 1 in which said means providing a longitudinal guideway is an anvil plate seated on the inner surface of said one wall at a level more remote from said web than said bores and formed adjacent its edge nearer said web with an open-ended, longitudinal groove facing said threaded means to define said guideway.

4. The device of claim 3 in which said anvil plate is removable for reversal and is formed, adjacent its opposite edge, with a second, open-ended, longitudinal groove, whose width is different from that of said first-named groove.

5. The device of claim 4 in which said carriage is mounted for movement transversely of the length of said side walls and substantially perpendicularly relative to said web.

6. The device of claim 5 including threaded means for so moving said carriage and locking the same in selected position.

7. The device of claim 1 including stop means between said walls and projecting into said region of interruption to present an abutment surface toward one end of said frame.

8. The device of claim 7 in which said stop means is resiliently flexible toward the level of said web.

9. The device of claim 7 in which said stop means is supported from said frame for bodily adjustment toward and away from said one end.

10. The device of claim 8 in which said stop means is supported from said frame for bodily adjustment toward and away from said one end.

* * * * *